(12) United States Patent
Kimura et al.

(10) Patent No.: US 12,404,905 B2
(45) Date of Patent: Sep. 2, 2025

(54) DOG CLUTCH CONTROL SYSTEM

(71) Applicant: DENSO CORPORATION, Kariya (JP)

(72) Inventors: Yusuke Kimura, Nisshin (JP); Junji Ute, Nisshin (JP); Hiroya Ando, Nisshin (JP); Shuhei Oe, Nisshin (JP); Daigo Arakida, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 19/030,584

(22) Filed: Jan. 17, 2025

(65) Prior Publication Data

US 2025/0163977 A1  May 22, 2025

Related U.S. Application Data

(63) Continuation of application No. PCT/JP2023/030313, filed on Aug. 23, 2023.

(30) Foreign Application Priority Data

Sep. 9, 2022  (JP) .................................. 2022-143714

(51) Int. Cl.
*F16D 48/06*    (2006.01)

(52) U.S. Cl.
CPC .... *F16D 48/06* (2013.01); *F16D 2500/10462* (2013.01)

(58) Field of Classification Search
CPC . F16D 48/06; F16D 48/10; F16D 2500/10462
See application file for complete search history.

(56) References Cited

U.S. PATENT DOCUMENTS

2013/0261910 A1* 10/2013 Ichikawa ............ F16H 61/0021
  701/58
2014/0283637 A1*  9/2014 Iwasaki ................. F16D 11/10
  74/335

FOREIGN PATENT DOCUMENTS

JP          4029875 B2    1/2008
JP       2009191954 A     8/2009
JP       2015227073 A  * 12/2015
JP       2021025658 A  *  2/2021

* cited by examiner

*Primary Examiner* — Edwin A Young
(74) *Attorney, Agent, or Firm* — Nixon & Vanderhye P.C.

(57) ABSTRACT

A dog clutch control system includes a dog clutch including a first engagement member and a second engagement member, an actuator, a rotational speed detecting unit, an arrival timing predicting unit, and a phase correcting unit. The arrival timing predicting unit predicts an arrival timing at which a rotational speed difference between the first engagement member and the second engagement member is adjusted to a value equal to or less than a predetermined threshold, based on the rotational speeds of the first and second engagement member and a time variation characteristic of the rotational speed difference during a rotational speed adjustment. The phase correcting unit performs a phase correction to bring an engageable timing, which is a timing at which the first engagement member is engageable with the second engagement member after the arrival timing, closer to the arrival timing compared to a case without the phase correction.

7 Claims, 15 Drawing Sheets

DOG CLUTCH CONTROL SYSTEM

CROSS REFERENCE TO RELATED APPLICATIONS

The present application is a continuation application of International Patent Application No. PCT/JP2023/030313 filed on Aug. 23, 2023, which designated the U.S. and claims the benefit of priority from Japanese Patent Application No. 2022-143714 filed on Sep. 9, 2022. The entire disclosures of all of the above applications are incorporated herein by reference.

TECHNICAL FIELD

The present disclosure relates to a control system for a dog clutch.

BACKGROUND

A control device detects the phase difference between a first engagement member and a second engagement member after the rotational speed difference between them becomes equal to or less than a predetermined value.

SUMMARY

According to one aspect of the disclosure, a dog clutch control system includes a dog clutch, an actuator, a rotational speed detecting unit, an arrival timing predicting unit, and a phase correcting unit.

The dog clutch includes a first engagement member and a second engagement member. The first engagement member is configured to rotate about an axis in a rotational direction and has first gear teeth on an entire circumference of the first engagement member in the rotational direction. The second engagement member is configured to rotate about the axis in the rotational direction and has second gear teeth on an entire circumference of the second engagement member in the rotational direction.

The actuator is configured to move at least one of the first engagement member and the second engagement member to switch between an engagement state, where the first engagement member is engaged with the second engagement member through engagement of the first gear teeth and the second gear teeth, and a disengagement state, where the first engagement member is disengaged from the second engagement member.

The rotational speed detecting unit is configured to detect a first rotational speed of the first engagement member and a second rotational speed of the second engagement member.

The arrival timing predicting unit is configured to predict an arrival timing at which a rotational speed difference between the first rotational speed and the second rotational speed is adjusted to a value equal to or less than a predetermined threshold during a rotational speed adjustment. The arrival timing is predicted based on the first rotational speed and the second rotational speed that are detected by the rotational speed detecting unit and a time variation characteristic of the rotational speed difference during the rotational speed adjustment.

The phase correcting unit is configured to perform a phase correction for at least one of the first engagement member and the second engagement member before the arrival timing.

The phase correcting unit is configured to perform the phase correction to bring an engageable timing closer to the arrival timing compared to a case without the phase correction. The engageable timing is a timing after the arrival timing and at which the first engagement member is engageable with the second engagement member.

DETAILED DESCRIPTION OF THE PREFERRED EMBODIMENTS

Figure 1:
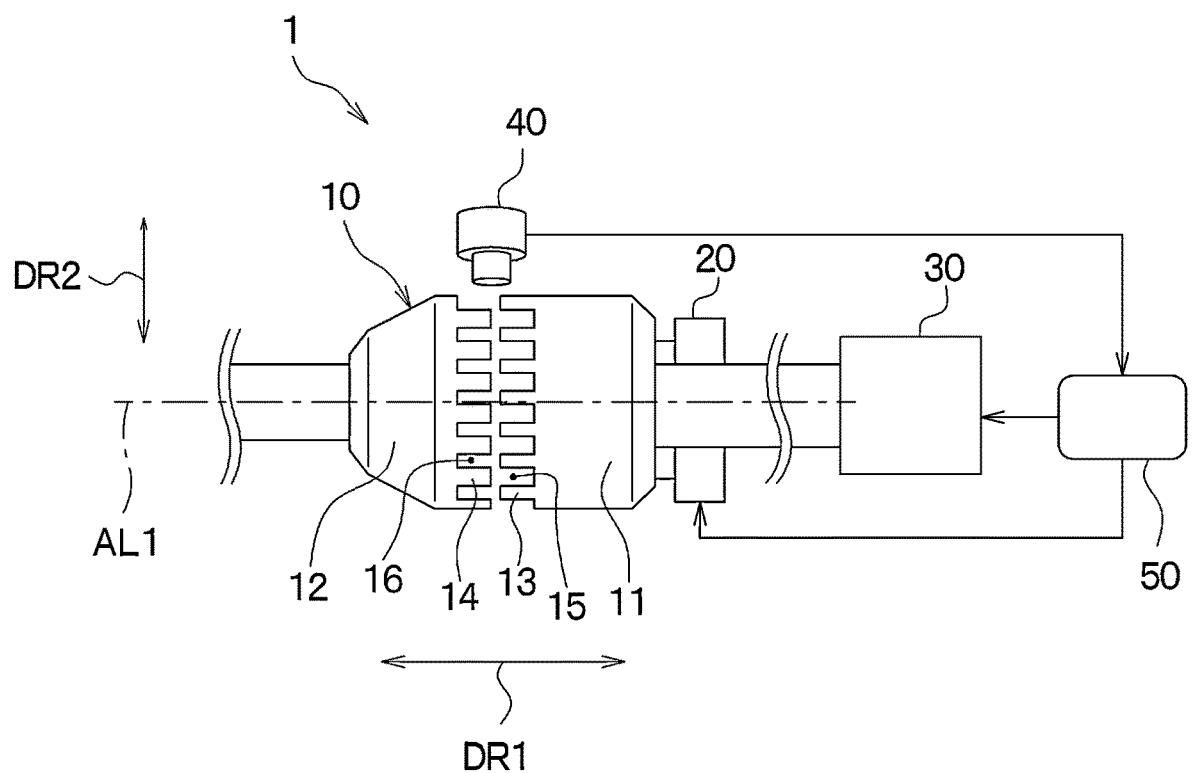
FIG. 1 is a diagram illustrating the configuration of a power transmission system according to a first embodiment.

To begin with, examples of relevant techniques will be described.

A control device detects the phase difference between a first engagement member and a second engagement member after the rotational speed difference between the first engagement member and the second engagement member becomes equal to or less than a predetermined value at which the first engagement member and the second engagement member is allowed to be engaged with each other. Then, the control device adjusts the driving state of an electric motor that rotates the first engagement member so that the phase difference between the first engagement member and the second engagement member becomes a value at which the first engagement member and the second engagement member is allowed to be engaged with each other.

In the above-described technology, the phase of the first engagement member is adjusted such that the phase difference is set to a value at which the first engagement member and the second engagement member are allowed to be engaged with each other after the rotational speed difference between the first engagement member and the second engagement member becomes equal to or less than a predetermined value. Thus, engagement cannot be performed until the phase difference becomes the engageable phase difference after the rotational speed difference becomes equal to or less than the predetermined value. This waiting period delays engagement of the dog clutch. Thus, the responsiveness of the dog clutch from when an engagement instruction is received until the engagement is actually performed is low. It is an objective of the present disclosure to provide a clutch control system that can improve responsiveness.

According to one aspect of the disclosure, a dog clutch control system includes a dog clutch, an actuator, a rotational speed detecting unit, an arrival timing predicting unit, and a phase correcting unit.

The dog clutch includes a first engagement member and a second engagement member. The first engagement member is configured to rotate about an axis in a rotational direction and has first gear teeth on an entire circumference of the first engagement member in the rotational direction. The second engagement member is configured to rotate about the axis in the rotational direction and has second gear teeth on an entire circumference of the second engagement member in the rotational direction.

The actuator is configured to move at least one of the first engagement member and the second engagement member to switch between an engagement state, where the first engagement member is engaged with the second engagement member through engagement of the first gear teeth and the second gear teeth, and a disengagement state, where the first engagement member is disengaged from the second engagement member.

The rotational speed detecting unit is configured to detect a first rotational speed of the first engagement member and a second rotational speed of the second engagement member.

The arrival timing predicting unit is configured to predict an arrival timing at which a rotational speed difference between the first rotational speed and the second rotational speed is adjusted to a value equal to or less than a predetermined threshold during a rotational speed adjustment. The arrival timing is predicted based on the first rotational speed and the second rotational speed that are detected by the rotational speed detecting unit and a time variation characteristic of the rotational speed difference during the rotational speed adjustment.

The phase correcting unit is configured to perform a phase correction for at least one of the first engagement member and the second engagement member before the arrival timing.

The phase correcting unit is configured to perform the phase correction to bring an engageable timing closer to the arrival timing compared to a case without the phase correction. The engageable timing is a timing after the arrival timing and at which the first engagement member is engageable with the second engagement member.

According to this, the phase correcting unit performs the phase correction before the arrival timing at which the rotational speed difference becomes equal to or less than the predetermined value. This phase correction brings the engageable timing closer to the arrival timing, compared to a case without the phase correction. Thus, compared to a case without the phase correction, the period from when the rotational speed difference reaches the predetermined value or less until the engageable state is established is shortened. Therefore, responsiveness is improved.

Hereinafter, embodiments of the present disclosure will be described with reference to the drawings. In the following embodiments, the same or equivalent parts are denoted by the same reference numerals.

(First Embodiment) A dog clutch control system of the present disclosure is applied to a power transmission system 1 shown in FIG. 1. The power transmission system 1 is mounted on a vehicle and transmits or blocks the power of an electric motor 30 to driving wheels. Specifically, the power transmission system 1 includes a dog clutch 10, an actuator 20, an electric motor 30, a phase difference sensor 40, and an arithmetic control device 50.

The dog clutch 10 has a first engagement member 11 and a second engagement member 12. The first engagement member 11 rotates about an axis line AL1. The direction parallel to the axis AL1 is the axial direction DR1. The first engagement member 11 includes multiple first gear teeth 13 on the end portion of the first engagement member 11 in the axial direction DR1. The first gear teeth 13 are formed on the entire circumference in a rotational direction in which the first engagement member 11 rotates about the axis AL1. The first gear teeth 13 are arranged in a row with spaces between each other. For this reason, the multiple first gear teeth 13 are correctively referred to as a row of the first gear teeth 13. A first gap 15 is defined between adjacent ones of the first gear teeth 13 in the rotational direction.

The second engagement member 12 rotates in the same direction as the first engagement member 11 about the same axis AL1 as the first engagement member 11. The second engagement member 12 includes multiple second gear teeth 14 that are configured to be engaged with the first gear teeth 13 on the end portion of the second engagement member 12. The second gear teeth 14 are formed on the entire circumference in the rotational direction. The second gear teeth 14 are arranged in a row with spaces between each other. For this reason, the multiple second gear teeth 14 are correctively referred to as a row of the second gear teeth 14. A second gap 16 is defined between adjacent ones of the second gear teeth 14 in the rotational direction.

The second engagement member 12 is connected to a rotational axis of the tire (i.e., the axle). The engagement between the first gear teeth 13 and the second gear teeth 14 engages the first engagement member 11 with the second engagement member 12 (i.e., connects the first engagement member 11 to the second engagement member 12).

The actuator 20 moves the first engagement member 11 between one side and the other side in the axial direction DR1. This movement of the first engagement member 11 in the axial direction DR1 switches between an engagement state, where the first engagement member 11 is engaged with the second engagement member 12 through engagement between the first gear teeth 13 and the second gear teeth 14, and a disengagement state, where the first engagement member 11 is disengaged from the second engagement member 12. When the disengagement state is switched to the engagement state, the first engagement member 11 moves toward the second engagement member 12 in the axial direction D1. The actuator 20 may be an electric motor or an electromagnetic solenoid.

The electric motor 30 is a drive source that provides the first engagement member 11 with a torque that rotates the first engagement member 11. That is, the electric motor 30 rotates the first engagement member 11.

The phase difference sensor 40 is used to detect the phase difference between the first engagement member 11 and the second engagement member 12, i.e., the relative phase. The phase difference is the difference between the phase of the first engagement member 11 and the phase of the second engagement member 12. The relative phase is the relationship between the phase of the first engagement member 11 and the phase of the second engagement member 12. The phase refers to the position of a gear tooth in the circumferential direction, and has the same meaning as the rotation angle. No phase difference means a state where the first engagement member 11 is engageable with the second engagement member 12 through engagement between the first gear teeth 13 and the second gear teeth 14. When there is a phase difference, the first engagement member 11 is prohibited from engaging with the second engagement member 12 since the first gear teeth 13 may collide with the second gear teeth 14. The phase difference sensor 40 outputs sensor signals according to the phase difference as described below.

Figure 2:
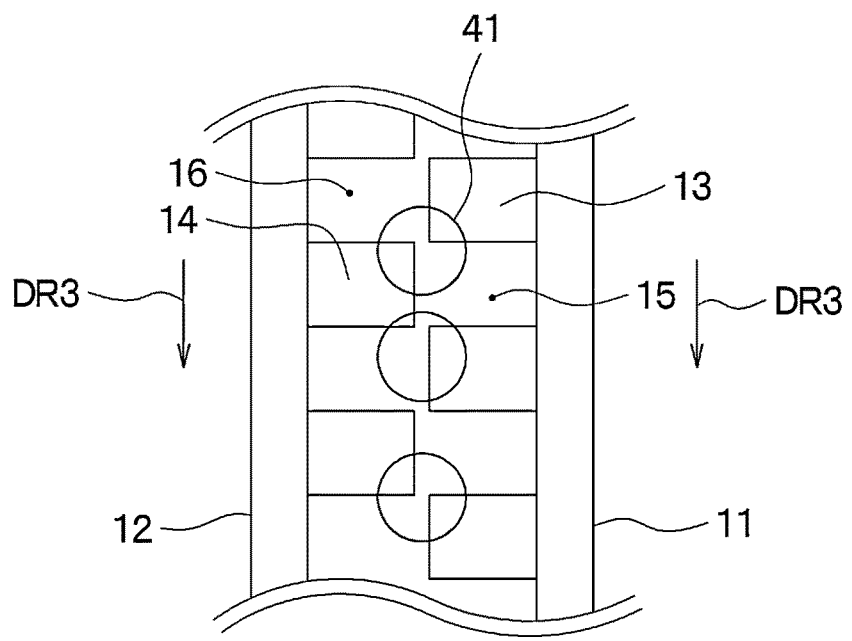
FIG. 2 is a diagram showing the relationship between gear teeth and the detection range of a phase difference sensor when a first engagement member and a second engagement member rotate in the same rotational direction, with the same rotational speed between the two and the relative phase between the two in an engageable state.

As shown in FIG. 2, the phase difference sensor 40 has a detection range 41. The phase difference sensor 40 is installed at a position where both the first gear tooth 13 and the second gear tooth 14 are within the detection range. More specifically, as shown in FIG. 1, the phase difference sensor 40 is disposed outside both the first gear teeth 13 and the second gear teeth 14 in a radial direction DR2 about the axis AL1. The radial direction DR2 is the same as the direction perpendicular to the axis AL1. The outer side in the radial direction DR2 is the side away from the center in the radial direction DR2. In this way, the phase difference sensor 40 is installed at a position at which the phase difference sensor 40 does not interfere with the engagement between the first engagement member 11 and the second engagement member 12. The phase difference sensor 40 outputs sensor signals according to the areas of the first gear teeth 13 and the second gear teeth 14 within the detection range 41. The phase difference sensor 40 may be, for example, a Hall element or a distance sensor.

The phase difference sensor 40 is connected to an input portion of the arithmetic control device 50. The sensor signals of the phase difference sensor 40 are input to the arithmetic control device 50. The output portion of the arithmetic control device 50 is connected to the actuator 20 and the electric motor 30. The arithmetic control device 50 is a controller that controls the electric motor 30 and the actuator 20.

The arithmetic control device 50 consists of a microcontroller including a processor, a memory, and the like, and peripheral circuits thereof. The memory stores control programs and control data for controlling the electric motor 30 and the actuator 20. The processor executes the control program to perform various processes.

Next, the sensor signals of the phase difference sensor 40 will be described. The sequential data of the sensor signals of the phase difference sensor 40 is a composite of two waveforms corresponding to the rotational speed and the phase of the first engagement member 11 and the second engagement member 12, as described below.

FIG. 2 shows a case where the first engagement member 11 and the second engagement member 12 rotate in the same rotational direction DR3, with the same rotational speed and the relative phase therebetween in an engageable state. The engageable state is a state in which the gear teeth of the first engagement member 11 and the gear teeth of the second engagement member 12 do not collide with each other. FIG. 2 shows multiple relative positions of the detection range 41 for the first engagement member 11 and the second engagement member 12 when the first engagement member 11 and the second engagement member 12 rotate. In this case, the total area of the first gear teeth 13 and the second gear teeth 14 in the detection range 41 of the phase difference sensor 40 is constant at any positions in the circumferential direction.

Figure 3:
FIG. 3 is a diagram showing sequential data of sensor signals of the phase difference sensor in the state of FIG. 2.

Therefore, as shown in FIG. 3, the sensor signals have a constant value over time. That is, the amplitude of the sequential data of the sensor signals is zero. When the actuator 20 is operated in this state, the first engagement member 11 and the second engagement member 12 can be engaged smoothly without failure.

Figure 4:
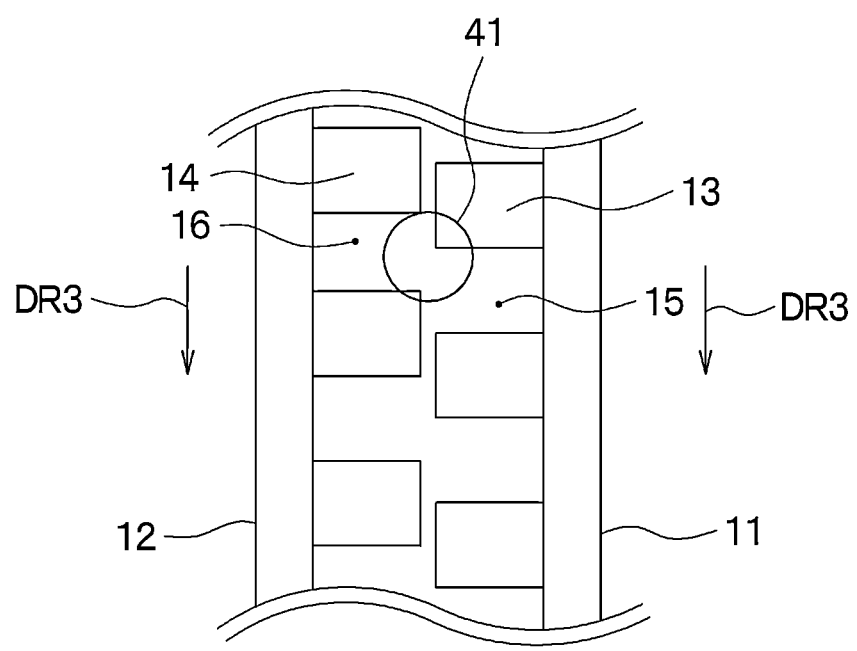
FIG. 4 is a diagram showing the relationship between the gear teeth and the detection range of the phase difference sensor when the first engagement member and the second engagement member rotate in the same rotational direction, with the same rotational speed between the two and the relative phase between the two in a non-engageable state.

FIG. 4 shows a case where the first engagement member 11 and the second engagement member 12 rotate in the same rotational direction DR3 with the same rotational speed and the relative phase therebetween in a non-engageable state. The non-engageable state is a state in which the gear teeth of the first engagement member 11 and the gear teeth of the second engagement member 12 collide with each other. In this case, the first gear teeth 13 and the second gear teeth 14 rotate integrally with each other while the first gear teeth 13 and the second gear teeth 14 face each other in the axial direction DR1.

Figure 5:
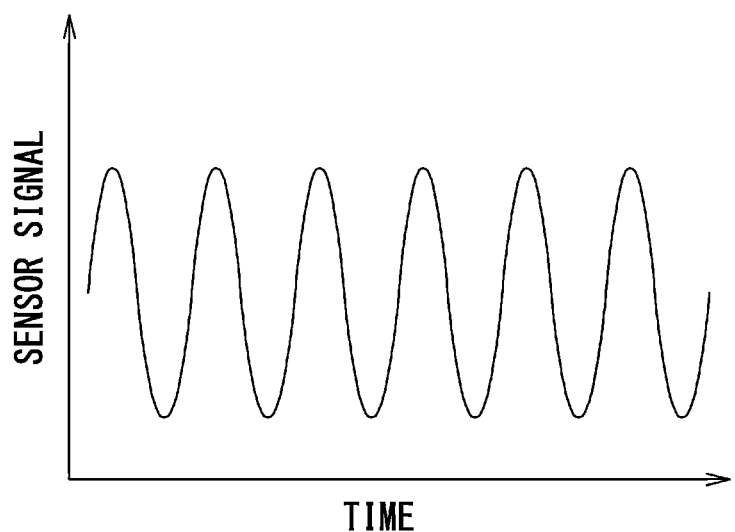
FIG. 5 is a diagram showing sequential data of sensor signals of the phase difference sensor in the state of FIG. 4.

Thus, as shown in FIG. 5, the sequential data of the sensor signals shows a waveform with a period corresponding to the rotation angle of one gear tooth.

Figure 6:
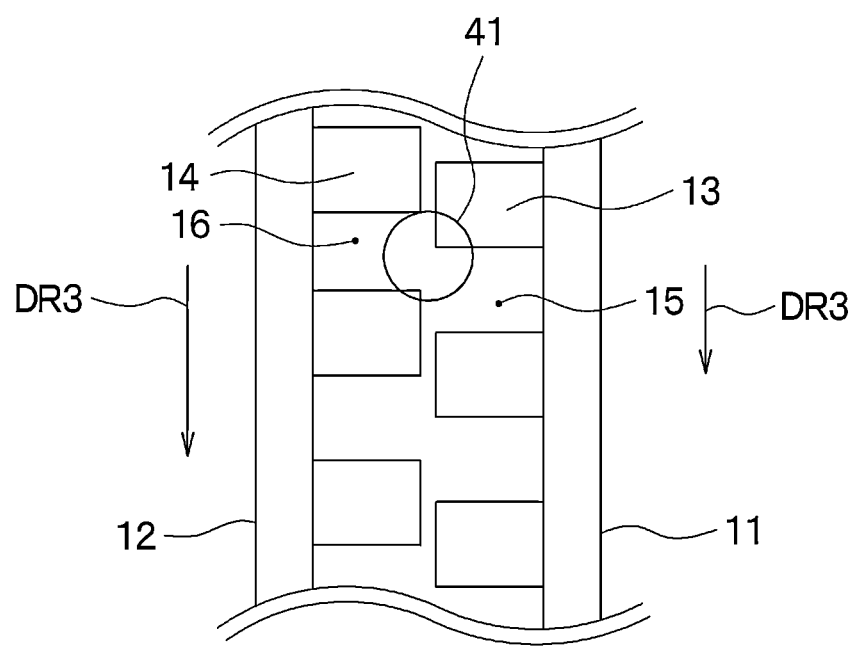
FIG. 6 is a diagram showing the relationship between the gear teeth and the detection range of the phase difference sensor when the first engagement member and the second engagement member rotate in the same rotational direction with rotational speed difference between the two.
Figure 7:
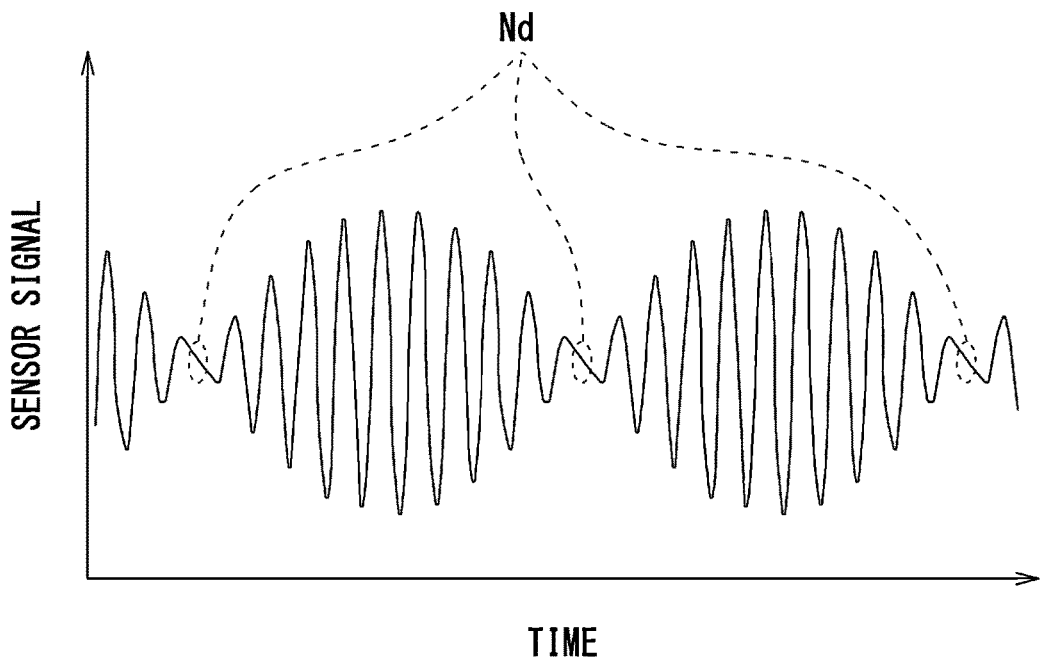
FIG. 7 is a diagram showing sequential data of sensor signals of the phase difference sensor in the state of FIG. 6.

FIG. 6 shows a case in which the first engagement member 11 and the second engagement member 12 rotate in the same rotational direction DR3 with the rotational speed difference therebetween. In FIG. 6, the rotational speed of the second engagement member 12 is greater than the rotational speed of the first engagement member 11. In this case, as shown in FIG. 7, the sequential data of the sensor signals shows a beat waveform. In this beat waveform, the constant value representing the engageable state shown in FIG. 3 and the sine wave representing the non-engageable state shown in FIG. 5 are repeated at intervals where the first gear tooth 13 and the second gear tooth 14 shift by one period. As shown in FIG. 3, when there is no phase difference, the amplitude is at a minimum, and therefore the nodes of the beat waveform shown in FIG. 7 correspond to timings Nd representing the engageable state. Thus, the timings of the engageable state can be determined as timing a when the amplitude of the sensor signals is equal to or less than a predetermined value.

Even at the engageable timing, when the first engagement member 11 engages with the second engagement member 12 with a significant rotational difference, a large shock will occur after the engagement. For this reason, it is necessary to engage the first engagement member 11 with the second engagement member 12 when the rotational difference falls within a predetermined range. Thus, in this embodiment, a control is performed in which the rotational speed of the rotational shaft of the electric motor 30 (i.e., the electric motor axis) is adjusted to be close to the rotational speed of the axle and the engagement is performed with the rotational speed difference less than the predetermined value.

The time variation in the rotational speed of the electric motor 30 during the rotational speed adjustment is also called the rotational speed profile or the time variation characteristic of the rotational speed of the electric motor 30. Here, the time variation in the rotational speed of the electric motor 30 (for example, an increase in the rotational speed) during the rotational speed adjustment occurs instantaneously, for example within one second, so the time variation in the rotational speed for the axle can be ignored. Thus, the time variation in the rotational speed difference between the first engagement member 11 and the second engagement member 12 depends on the time variation in the rotational speed of the electric motor 30. The time variation in the rotational speed of the electric motor 30 during the rotational speed adjustment is determined based on the control characteristics of the electric motor 30. That is, the time variation in the rotational speed difference during the rotational speed adjustment varies depending on a product of the electric motor 30.

The arithmetic control device 50 stores the time variation of the rotational speed of the electric motor 30 during the rotational speed adjustment in advance. The arithmetic control device 50 can predict future rotational speed difference based on the rotational speed difference between the first engagement member 11 and the second engagement member 12 at the start of the rotational speed adjustment and the time variation characteristics of the rotational speed of the electric motor 30. Furthermore, the arithmetic control device 50 can predict the time when the future rotational speed difference will reach a predetermined rotational speed difference.

The timing of the engageable state occurs at a period corresponding to the time variation of the rotational speed difference during the rotational speed adjustment. Thus, the arithmetic control device 50 can calculate the future timing of the engageable state based on the sequential data of the sensor signals and the time variation of the rotational speed of the electric motor 30 during the rotational speed adjustment.

Figure 8:
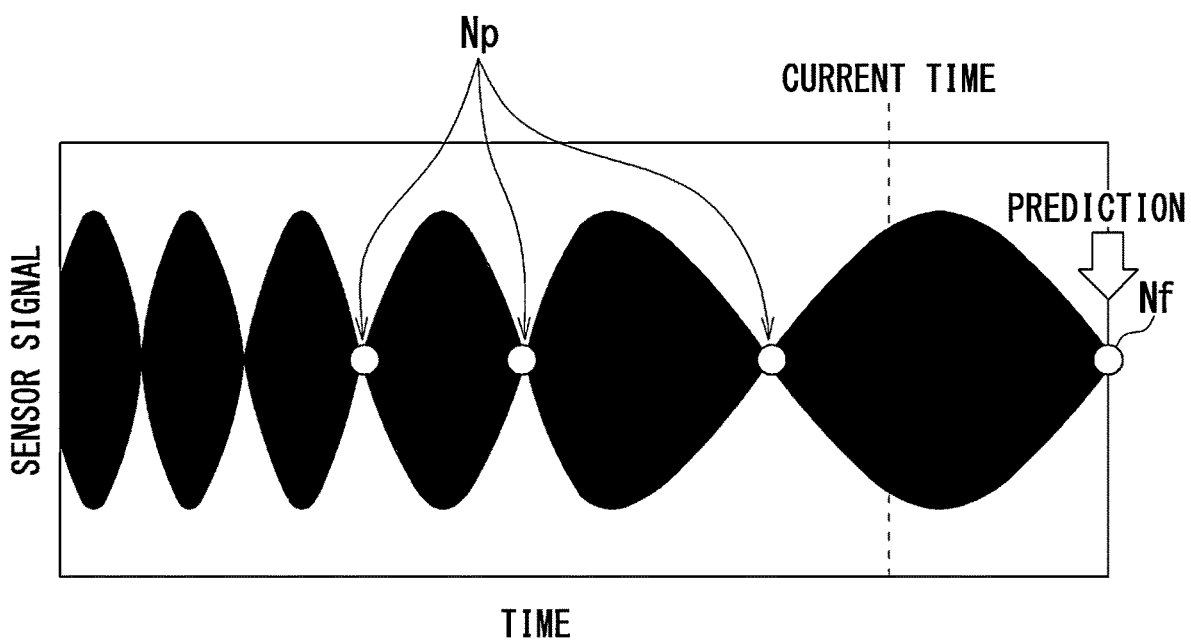
FIG. 8 is a diagram showing how to predict a future timing of the engageable state from previous timings of the engageable state based on sequential data of the sensor signals of the phase difference sensor.

As shown in FIG. 8, the arithmetic control device 50 stores multiple previous timings Np of the engageable state. The time intervals between the previous timings of the engageable state change as the time elapses. The future timing of the engageable state can be predicted by predicting this change after the current time. Thus, the arithmetic control device 50 can predict the future timing Nf of the engageable state based on the relationship, which is found from the previous timings for the engageable state, between the elapsed time and the timing for the engageable state.

The arithmetic control device 50 transmits an engagement instruction to the actuator 20 when the difference between the future timing of the engageable state calculated as described above and the current time becomes equal to a time for the clutch actuation delay. This makes it possible to engage the first engagement member 11 and the second engagement member 12 without collision between the gear teeth.

Figure 9:
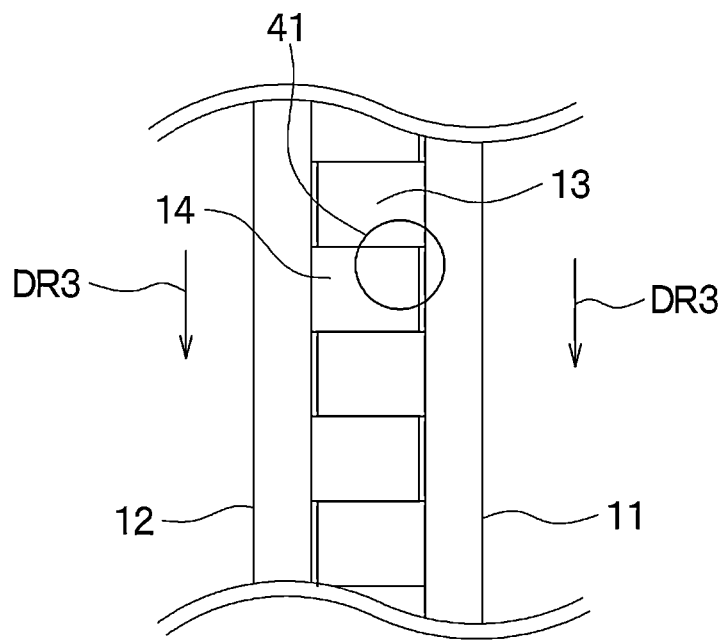
FIG. 9 is a diagram showing the relationship between the gear teeth and the detection range of the phase difference sensor when the first engagement member and the second engagement member are engaged with each other.
Figure 10:
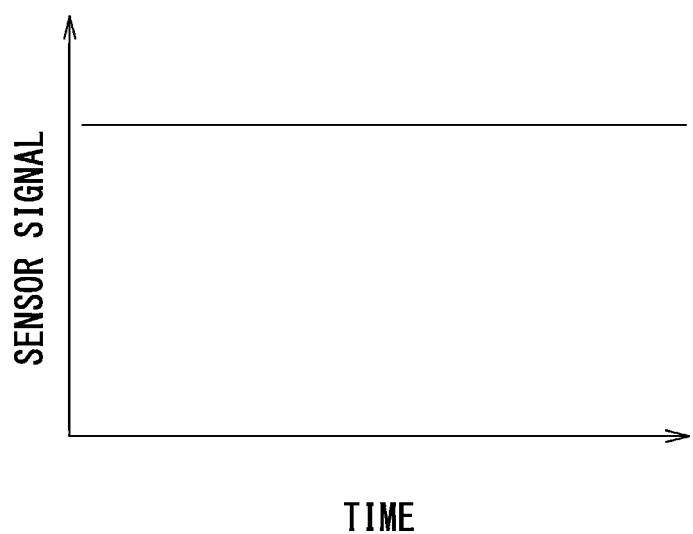
FIG. 10 is a diagram showing sequential data of sensor signals of the phase difference sensor in the state of FIG. 9.

Furthermore, as shown in FIG. 9, when the first engagement member 11 and the second engagement member 12 engage with each other, the first engagement member 11 and the second engagement member 12 rotate at the same speed and the first gear teeth 13 and the second gear teeth 14 mesh with each other, thereby minimizing the gap between the first gear teeth 13 and the second gear teeth 14. Thus, as shown in FIG. 10, the sequential data of the sensor signals of the phase difference sensor 40 has a maximum constant value. Therefore, it is also possible to determine whether the engagement is successfully performed based on the sequential data of the sensor signals of the phase difference sensor 40.

However, even when the rotational speed difference between the axle and the motor shaft is equal to or less than a predetermined value that is appropriate for the engagement between the first gear teeth 13 and the second gear teeth 14, the relative phase may be the non-engageable state. In this case, the engagement is suspended until the relative phase becomes the engageable state. This waiting period delays engagement of the dog clutch 10. Therefore, the response of the dog clutch 10 is low.

Figure 11:
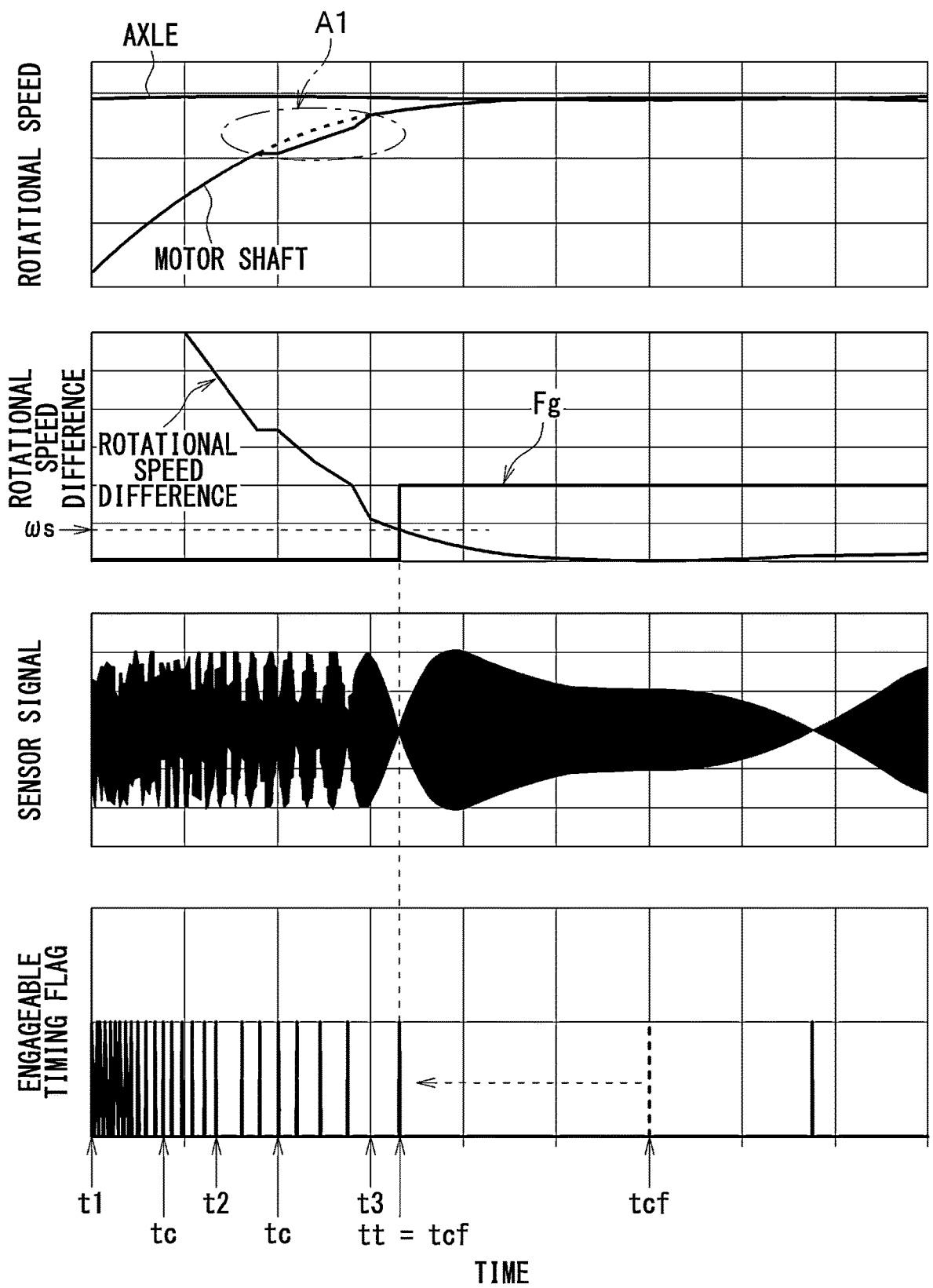
FIG. 11 is a diagram showing a phase correction, a target engagement timing, and timings of an engageable state in the first embodiment.

Regarding this issue, in this embodiment as shown in FIG. 11, the arithmetic control device 50 corrects the rotational speed of the motor shaft so that the timing of the engageable state arrives at the timing when the rotational speed difference between the axle and the motor shaft reaches the predetermined value or less. Specifically, the arithmetic control device 50 performs a phase correction control after the rotational speed adjustment in which the rotational speed of the first engagement member 11 is adjusted to be close to the rotational speed of the second engagement member 12 and before the rotational speed difference between the two becomes equal to or less than the predetermined value. In this phase correction control, the arithmetic control device 50 predicts a target engagement timing (i.e., the target time of engagement) when the rotational speed difference is equal to or less than the predetermined value, and predicts the timing of the engageable state after the target engagement timing. The target engagement timing (i.e., the target time of the engagement) corresponds to the arrival time at which the rotational speed difference during the rotational speed adjustment reaches the predetermined value or less. The timing of the engageable state after the target engagement timing corresponds to the predicted engageable timing after the arrival timing.

Then, the arithmetic control device 50 performs the phase correction on the first engagement member 11 that is rotating to bring the predicted timing of the engageable state closer to the target engagement timing. In this phase correction, as shown in the area A1 in FIG. 11, the arithmetic control device 50 changes the phase of the first engagement member 11 by changing the rotational speed of the electric motor 30 as indicated by the dashed line compared to the time variation of the rotational speed of the electric motor 30 for which the phase correction is not performed. This phase correction is performed only during a part of the rotational speed adjustment period. This phase correction can change the relative phase of the gear teeth and control the timing of the engageable state. This phase correction, as shown in FIG. 11, causes the timing tcf of the engageable state to match with the target engagement timing tt at which the rotational speed of the motor shaft and the rotational speed of the axle becomes the predetermined value or less. In FIG. 11, when the rotational speed difference becomes equal to or less than the predetermined value ωs, an engageable rotational speed difference flag Fg, which indicates that the rotational speed difference is appropriate for the engagement, is set. At the timings of nodes in the time series data of the sensor signals of the phase difference sensor 40, an engageable timing flag is set, which indicates the timings of the engageable state. The timing at which the engageable rotational speed difference flag Fg is set coincides with the timing at which the engageable time flag is set.

According to this embodiment, the engagement can be achieved at the timing when both the rotational speed of the motor shaft and the rotational speed of the axle becomes the predetermined value or less. There is no need to wait for engagement after both rotational speeds is equal to or less than the predetermined value. This makes it possible to dramatically improve responsiveness. The phase correction by the arithmetic control device 50 is not limited to the correction by decreasing the rotational speed, and may be a correction by increasing the rotational speed.

Next, the arithmetic control executed by the arithmetic control device 50 according to this embodiment will be specifically described. When receiving an engagement instruction, the arithmetic control device 50 performs the process shown in FIG. 12 to engage the dog clutch 10. The steps shown in the figure correspond to functional units that realize various functions. This also applies to the other figures.

In step S1, the arithmetic control device 50 stores an instruction time t1 when the engagement instruction is received.

Next, in step S2, the arithmetic control device 50 detects the first rotational speed ω1 of the first engagement member 11 and the second rotational speed ω2 of the second engagement member 12. The first rotational speed ω1 is detected by a resolver built into the electric motor 30. The second rotational speed ω2 is detected by a wheel speed sensor.

Next, in step S3, the arithmetic control device 50 calculates the torque Tω of the electric motor 30 required to make the rotational speed difference between the first engagement member 11 and the second engagement member 12 equal to or less than the predetermined value ωs. The predetermined value ωs is equal to or greater than 0. The torque Tω is calculated using the first rotational speed ω1 and the second rotational speed ω2 detected in step S3 and the time variation characteristics of the rotational speed of the electric motor 30 that are stored in advance.

Next, in step S4, the arithmetic control device 50 outputs the torque Tω to the electric motor 30. As a result, the first rotational speed ω1 of the first engagement member 11 connected to the electric motor 30 starts to change.

Next, in step S5, the arithmetic control device 50 predicts a future rotational speed difference Δω, and a target timing tt for the engagement at which the future rotational speed difference Δω reaches the predetermined value ωs or less. The prediction of the future rotational speed difference Δω and the target timing tt of the engagement is performed based on the first rotational speed ω1 and the second rotational speed ω2 detected in step S2 and the time variation characteristics of the rotational speed of the electric motor 30.

Next, in step S6, the arithmetic control device 50 detects and stores multiple previous timings tc for the engageable state before the target timing tt of the engagement, based on the sequential data of the sensor signals of the phase difference sensor 40.

Next, in step S7, the arithmetic control device 50 determines whether the current time tn has passed the start time t2 of the phase control. The start time t2 of the phase control is arbitrary set to a time obtained by subtracting predetermined times such as the clutch delay time and the time required for torque control from the target timing tt of the engagement. If the determination is YES, the arithmetic control device 50 proceeds the process to step S8 and starts the phase correction control. If the determination is NO, the arithmetic control device 50 returns the process to step S6.

In step S8, the arithmetic control device 50 predicts at least one timing tcf for the engageable state after the target engagement timing tt based on the relationship, which is found from the previous timings tc of the engageable state stored in Step S6, between the elapsed time and the timings for the engageable state. As described above, the timing for the engageable state occurs at a period corresponding to the time variation in the rotational speed of the electric motor 30 during the rotational speed adjustment. The nodes of the beat waveform shown in FIG. 7 indicate the timings for the engageable state. Based on these facts, in step S8, the arithmetic control device 50 may predict the timing tcf for the engageable state after the target engagement timing tt based on the sequential data of the sensor signals of the phase difference sensor 40 during the rotational speed adjustment and the time variation characteristics of the rotational speed of the electric motor 30. The time variation characteristic of the rotational speed of the electric motor 30 corresponds to the time variation characteristic of the rotational speed difference.

Next, in step S9, the arithmetic control device 50 calculates the difference Δt between the timing tcf for the engageable state and the target timing tt for the engagement.

Subsequently, in step S10, the arithmetic control device 50 calculates a correction torque Tθ1 for the electric motor 30 according to the difference Δt calculated in step S9. The correction torque Tθ1 for the electric motor 30 according to the difference Δt is the torque for the electric motor 30 to set the time difference Δt to zero. The correction torque Tθ1 is calculated based on the relationship, which is known in advance, between the input torque and the change in the timing for the engageable state.

Next, in step S11, the arithmetic control device 50 outputs the correction torque Tθ to the electric motor 30. That is, the arithmetic control device 50 outputs control signals to set the torque of the electric motor 30 to the correction torque Tθ1. As a result, as shown in the area A1 in FIG. 11, the rotational speed of the motor shaft is decreased compared to the time variation of the rotational speed of the electric motor 30 during the rotational speed adjustment without the phase correction. As a result, as shown in FIG. 11, the timing tcf of the engageable state after the phase correction match with the target timing tt of the engagement. As shown in FIG. 11, the phase correction is performed within a range in which the target timing tt of the engagement does not change.

Next, in step S12, the arithmetic control device 50 determines whether the current time tn has reached a clutch actuation start timing t3 that is prior to the target engagement timing tt. The clutch actuation start timing t3 is obtained by subtracting the time for the clutch actuation delay, safety margin, and the like from the target timing tt. If the determination is YES, the arithmetic control device 50 proceeds the process to step S13. If the determination is NO, the arithmetic control device 50 returns the process to step S12 after a predetermined time has elapsed.

In step S13, the arithmetic control device 50 activates the dog clutch 10. That is, the arithmetic control device 50 operates the actuator 20 to engage the dog clutch 10. This completes the process shown in FIG. 12.

Figure 12:
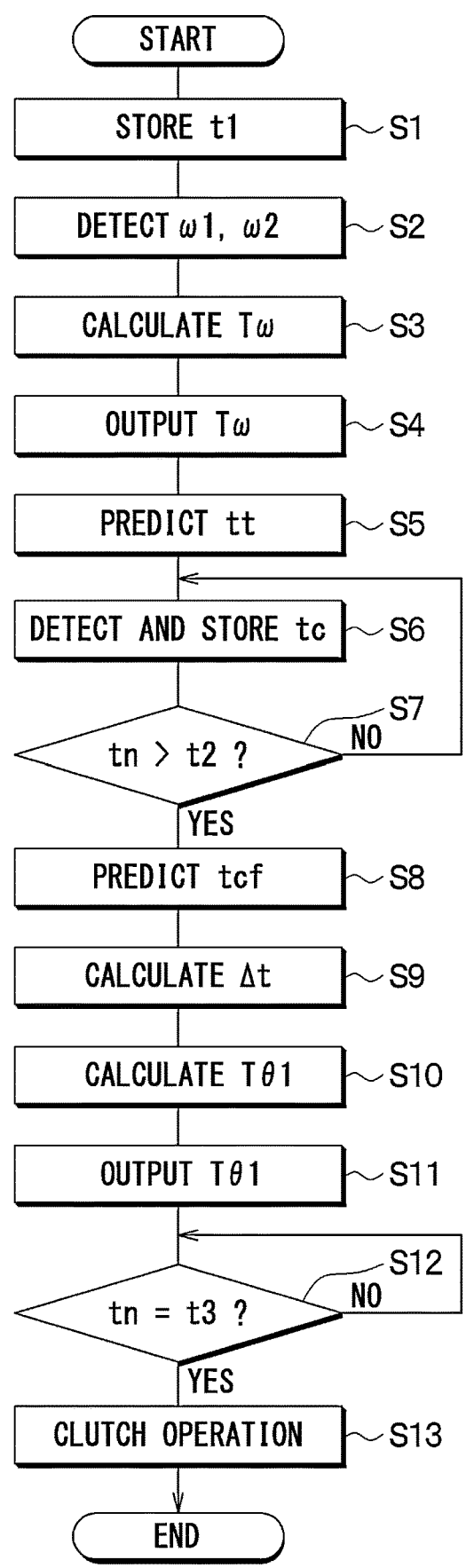
FIG. 12 is a flowchart showing a process executed by an arithmetic control device of the first embodiment.

In the process shown in FIG. 12, step S2 corresponds to a rotational speed detection unit configured to detect a first rotational speed of the first engagement member 11 and a second rotational speed of the second engagement member 12. Step S5 corresponds to an arrival timing predicting unit configured to predict the arrival timing when the rotational speed difference reaches a predetermined value or less during the rotational speed adjustment. Step S8 corresponds to an engageable timing predicting unit configured to predict a predicted engageable timing at which the first engagement member 11 and the second engagement member 12 are engageable with each other after the arrival time that is predicted by the arrival timing predicting unit. Steps S10 and S11 correspond to a phase correcting unit configured to perform a phase correction for at least one of the first engagement member 11 and the second engagement member 12.

In this embodiment, the rotational speed adjustment of the first engagement member 11 is started while the first engagement member 11 is rotating. However, the rotational speed adjustment of the first engagement member 11 may be started while the first engagement member 11 is stopped.

Figure 13:
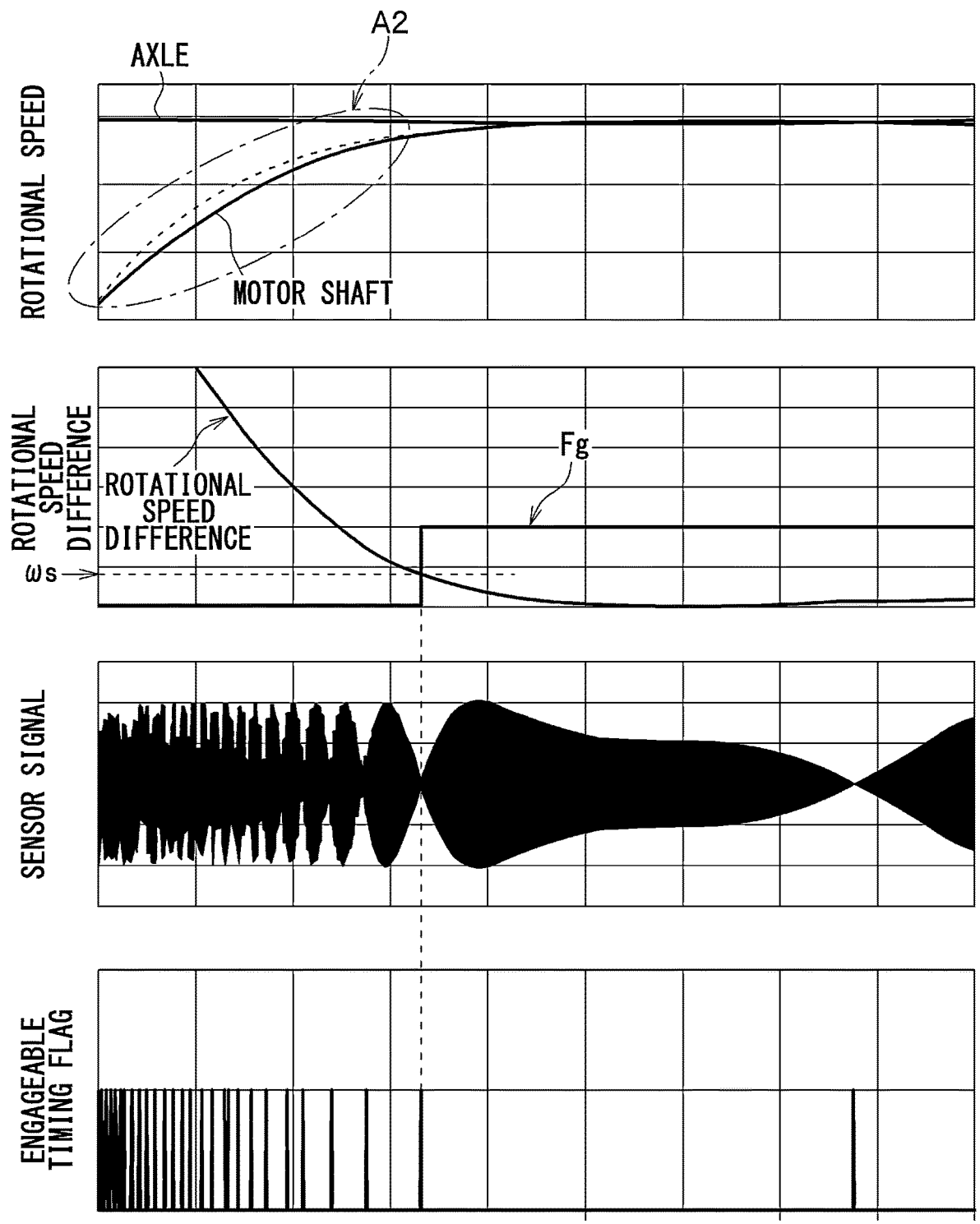
FIG. 13 is a diagram showing a phase correction, a target engagement timing, and timings of an engageable state in a second embodiment.

(Second embodiment) In this embodiment, as shown in the area A2 in FIG. 13, the arithmetic control device 50 performs the phase correction over the entire period of the rotational speed adjustment. The phase correction is performed in the same manner as in the first embodiment. Remaining configurations are the same as those in the first embodiment. The similar advantages as those of the first embodiment can be obtained in this embodiment. This embodiment is effective in cases where the inertia of the rotating member is large, such as in a large motor, and it is difficult to perform phase correction in a short time.

(Third embodiment) In the first embodiment, the phase correction is performed based on the difference between the predicted timing tcf for the engageable state and the target engagement timing (i.e., the target timing tt for the engagement). In contrast to this, in this embodiment, as shown in FIG. 14, the phase difference at the target engagement timing is predicted, and the phase is corrected based on this predicted phase difference.

Figure 14:
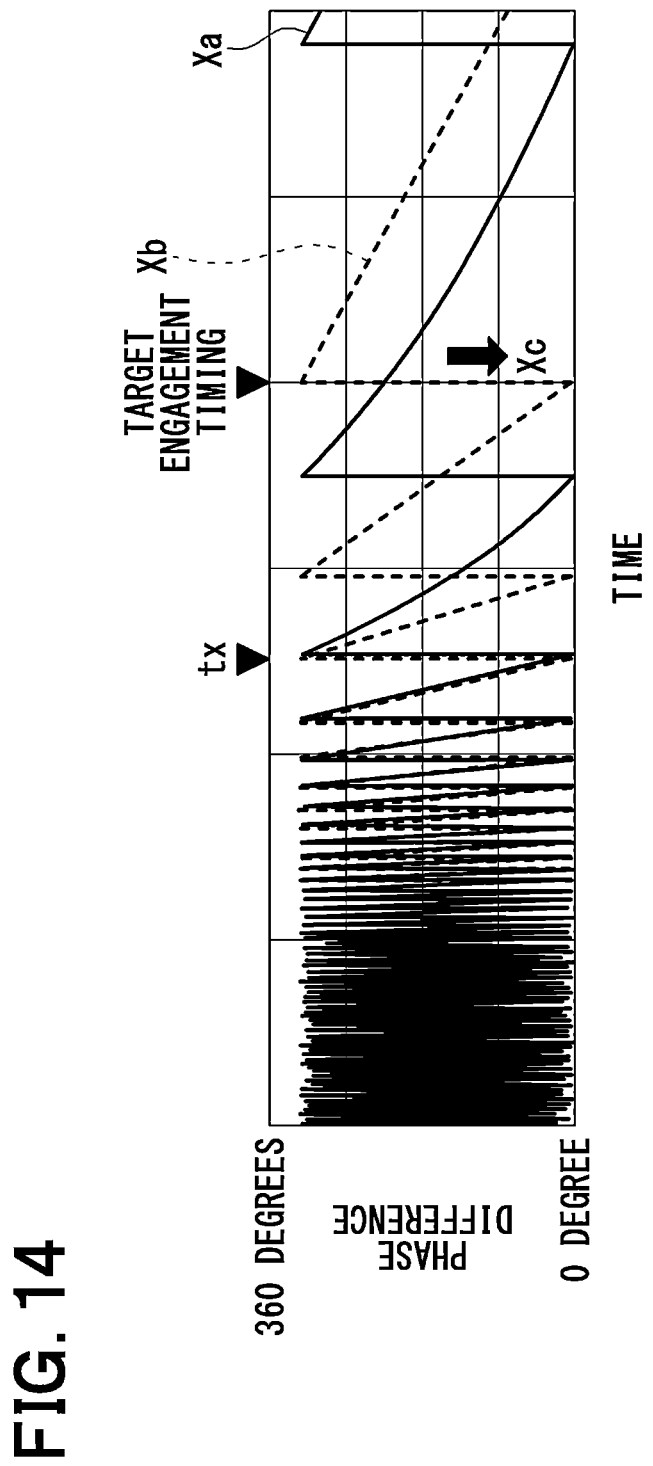
FIG. 14 is a diagram showing a phase correction in a third embodiment.

FIG. 14 shows the time variation of the phase difference between the first engagement member 11 and the second engagement member 12 during the rotational speed adjustment to adjust the rotational speed difference between the first engagement member 11 and the second engagement member 12 to a predetermined value or less. The timing for the engageable state is when the phase difference is 0 degrees or 360 degrees. The phase difference varies over time between 0 degrees and 360 degrees.

The phase difference at the target engagement timing can be predicted based on the multiple previous timings for the engageable state before the target engagement timing and the respective rotational speeds of the first engagement member 11 and the second engagement member 12. In the beat waveform shown in FIG. 7, the phase difference when the amplitude is minimum is 0 degrees, and the phase difference when the amplitude is maximum is 180 degrees. Therefore, the phase difference at the target engagement timing can also be predicted based on the sequential data of the sensor signals and the time variation of the rotational speed difference during the rotational speed adjustment. In addition, the phase difference at the target engagement timing can also be predicted by linearly interpolating between the timing for the engageable state immediately before the target engagement timing and the timing for the engageable state immediately after the target engagement timing.

Therefore, the arithmetic control device 50 predicts the target engagement timing and the phase difference Xa between the first engagement member 11 and the second engagement member 12 at the target engagement timing, as shown by the solid line in FIG. 14. The arithmetic control device 50 corrects the rotational speed of the electric motor 30, i.e., the torque of the electric motor 30, so that the phase difference at the predicted target engagement timing is 0 degree. The corrected torque at this time is determined based on a map showing the relationship between the input torque amount, the torque input time, and the amount of change in the phase difference. This phase correction changes the phase difference as shown by the phase difference after the phase correction indicated by the dashed line Xb in FIG. 14, and the phase difference at the target engagement timing changes to 0 degree as indicated by the arrow Xc. The torque input tx in FIG. 14 is the phase correction. Also in this embodiment, the timing for the engageable state aligns with the target engagement timing. Thus, similar advantages to those of the first embodiment can be obtained.

Next, the arithmetic control executed by the arithmetic control device 50 according to this embodiment will be specifically described. When receiving an engagement instruction, the arithmetic control device 50 performs the process shown in FIG. 15 to engage the dog clutch 10.

Figure 15:
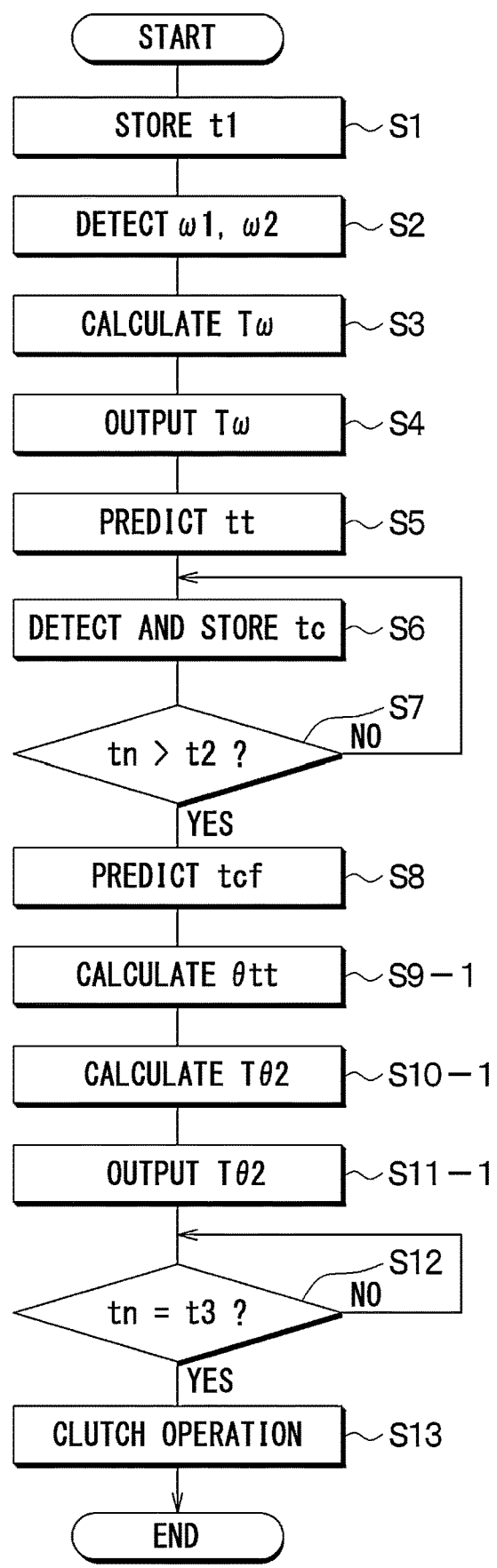
FIG. 15 is a flowchart showing a process executed by an arithmetic control device of the third embodiment.

In the flowchart of FIG. 15, steps S9, S10, and S11 in the flowchart of FIG. 12 are changed to steps S9-1, S10-1, and S11-1, respectively. The other steps in FIG. 15 are the same as those in FIG. 12.

In step S9-1, the arithmetic control device 50 calculates the phase difference θtt at the target timing tt for the engagement. The phase difference θtt is calculated by the method described above.

Next, in step S10-1, the arithmetic control device 50 calculates a correction torque Tθ2 corresponding to the phase difference θtt at the target timing tt for the engagement. This correction torque Tθ2 is determined based on the above map to change the phase difference θtt to 0 degree.

Next, in step S11-1, the arithmetic control device 50 outputs the correction torque Tθ2 to the electric motor 30. As a result, the rotational speed of the electric motor 30 changes. As a result, as shown in FIG. 14, the phase difference θtt after the phase correction at the target timing tt of the engagement is adjusted to 0 degree.

In the process shown in FIG. 15, step S9-1 corresponds to a phase difference predicting unit configured to predict the phase difference between the first engagement member 11 and the second engagement member 12 at the arrival time that is predicted by the arrival time predicting unit. Steps S10-1 and S11-1 correspond to a phase correcting unit configured to perform a phase correction for at least one of the first engagement member 11 and the second engagement member 12.

Figure 16:
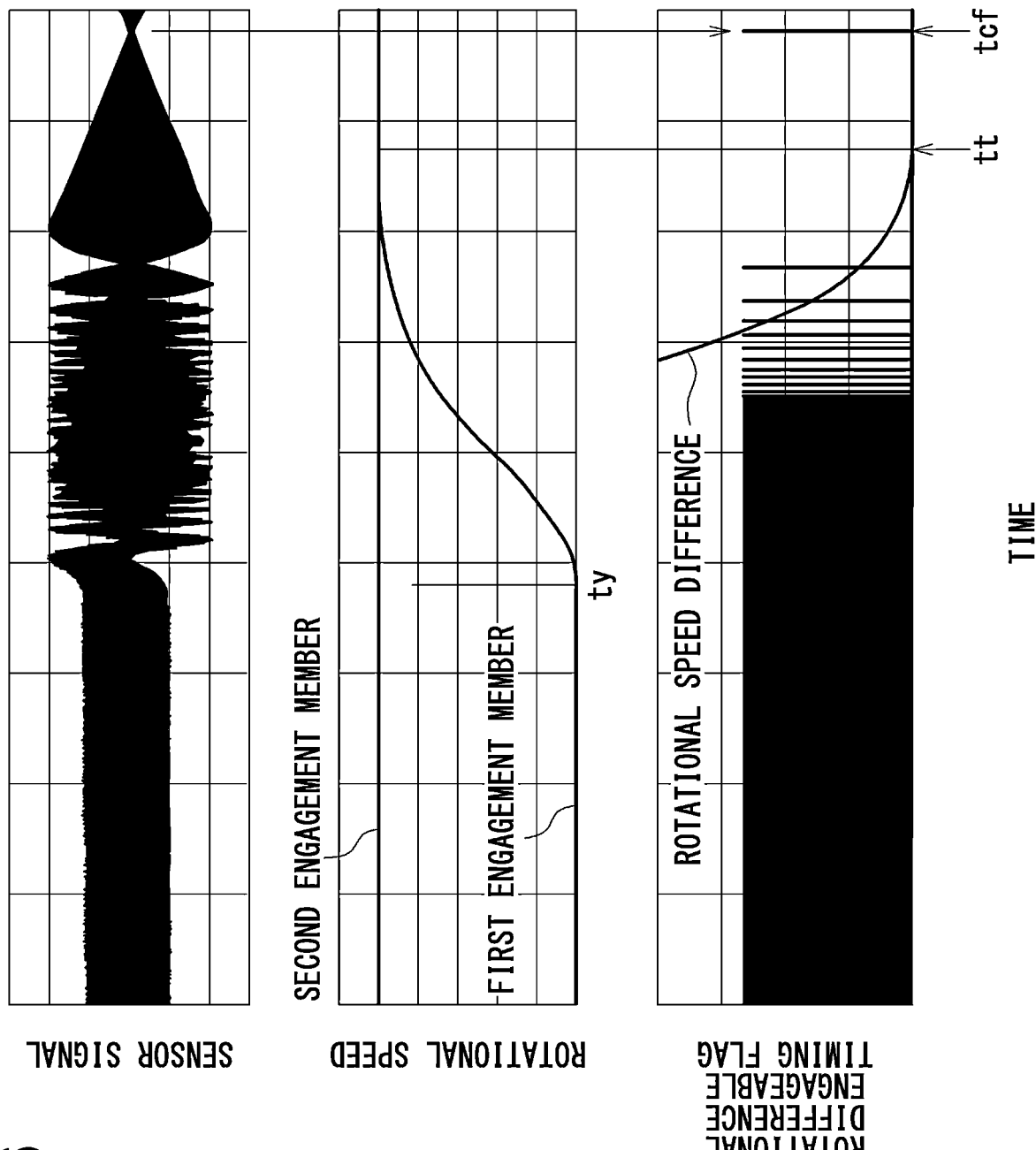
FIG. 16 is a diagram showing a phase correction, a target engagement timing, and timings of an engageable state in a comparative example.

(Fourth embodiment) FIG. 16 shows a case in which the second engagement member 12 for the axle is rotating and the first engagement member 11 for the motor shaft is stopped, and then the first engagement member 11 starts to rotate at the time ty, and the rotational speed of the first engagement member 11 is increased to the same value as that of the second engagement member 12. In FIG. 16, the timing tcf for the engageable state occurs after the target engagement timing (i.e., the target timing tt for the engagement) at which the rotational speed difference reaches a value less than the predetermined value. In this case, even when the rotational speed difference reaches the engageable rotational speed difference, the engagement is suspended until the relative phase becomes the engageable state. Therefore, the response of the dog clutch 10 is low.

Figure 17:
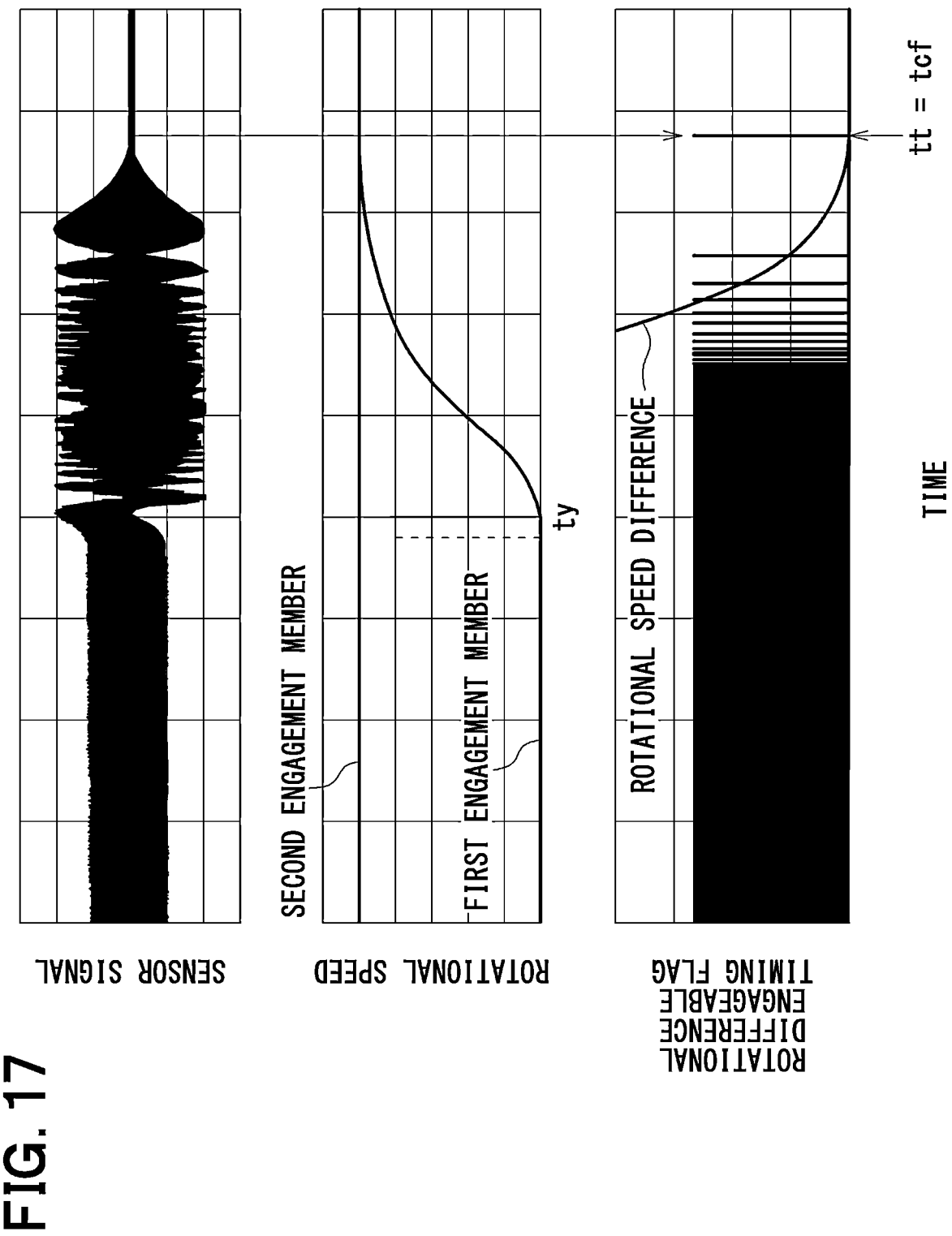
FIG. 17 is a diagram showing a phase correction, a target engagement timing, and timings of an engageable state in a fourth embodiment.

The timing tcf for the engageable state is changed by changing the rotation start timing of the first engagement member 11. Thus, as shown in FIG. 17, in this embodiment, the arithmetic control device 50 adjusts the rotation start timing ty of the first engagement member 11 so that the timing for the engageable state coincides with the target timing tt for the engagement. In FIG. 17, the rotation start timing of the first engagement member 11 is changed from the timing indicated by the dashed line to the timing indicated by the solid line. In FIG. 17, the timings at which the engageable timing flag is set is the timings for the engageable state. According to this, the target timing for the engageable state coincides with the target timing tt for the engagement, thereby obtaining the similar effects as in the first embodiment.

In this embodiment, the arithmetic control device 50 predicts the timing tcf for the engageable state after the target timing tt for the engagement based on the time variation of the phase of the rotating second engagement member 12, the phase of the stationary first engagement member 11, and the time variation characteristics of the rotational speed of the electric motor 30. In this manner, the timing tcf of the engageable state can be predicted. At this time, the arithmetic control device 50 detects the phase of the first engagement member 11 and the phase of the second engagement member 12 as follows.

Figure 18:
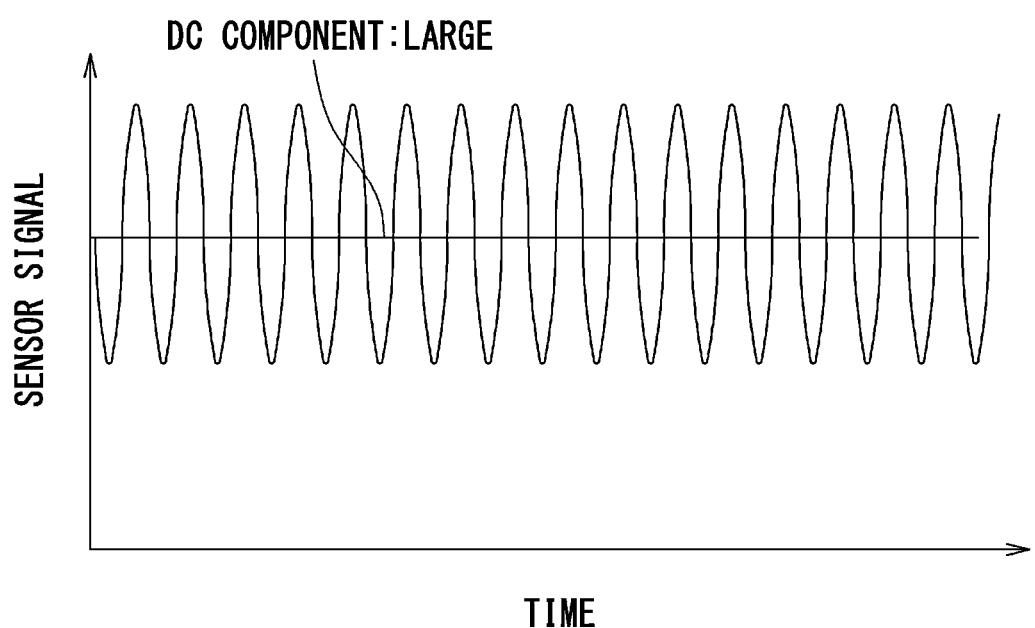
FIG. 18 is a diagram showing sequential data of sensor signals when the second engagement member is rotating and the first engagement member is stationary.
Figure 19:
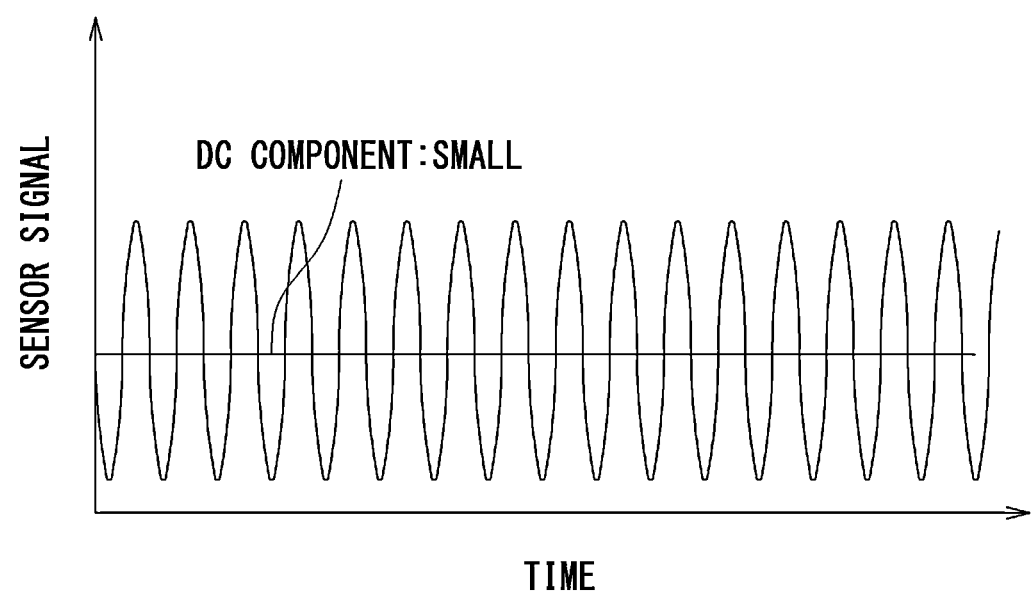
FIG. 19 is a diagram showing sequential data of sensor signals when the second engagement member is rotating and the first engagement member is stationary.
Figure 20:
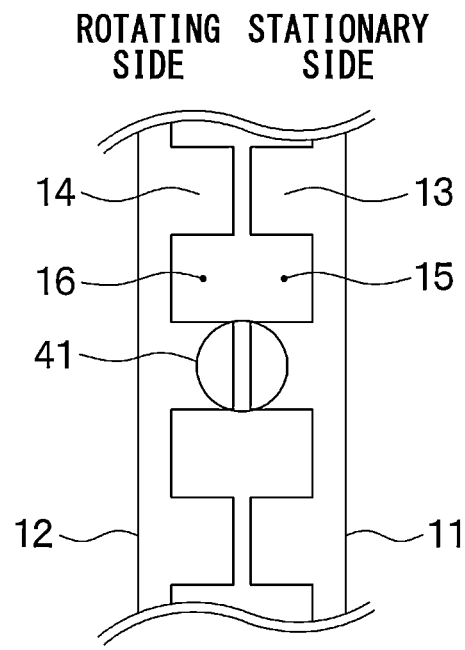
FIG. 20 is a diagram showing a state in which the second engagement member is rotating and the first engagement member is stationary, and the first gear tooth of the first engagement member is within the detection range of the phase difference sensor.
Figure 21:
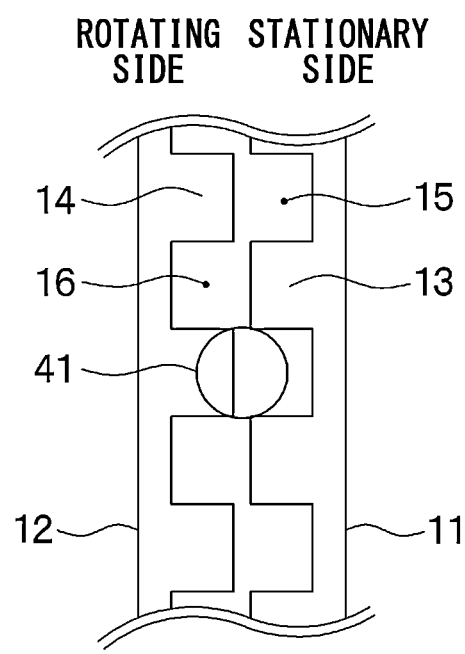
FIG. 21 is a diagram showing a state in which the second engagement member is rotating and the first engagement member is stationary, and the first gear tooth of the first engagement member is outside the detection range of the phase difference sensor.

In a state where the second engagement member 12 is rotating and the first engagement member 11 is stopped, as shown in FIGS. 18 and 19, the offset amount in the waveform representing the sequential data of the sensor signals changes depending on whether the first gear tooth 13 of the stationary first engagement member 11 is within the detection range 41 of the phase difference sensor 40. As shown in FIG. 20, when the first gear tooth 13 of the stationary first engagement member 11 is present within the detection range 41 of the phase difference sensor 40, the sensor signals show the waveform shown in FIG. 18. As shown in FIG. 21, when the first gear tooth 13 of the stationary first engagement member 11 is not present within the detection range 41 of the phase difference sensor 40, the sensor signals show the waveform as shown in FIG. 19.

As can be seen by comparing FIGS. 18 and 19, the direct-current components of the sequential data of the sensor signals when the first gear tooth 13 of the stationary first engagement member 11 is within the detection range 41 is larger than the DC component when the first gear tooth 13 is outside the detection range 41. In this way, there is a predetermined relationship between the direct-current components of the sequential data of the sensor signal and the phase of the first gear teeth 13 of the stationary first engagement member 11. Thus, the arithmetic control device 50 can obtain the direct-current components by using a low-pass filter or time averaging, and detect the phase of the first gear teeth 13 of the stationary first engagement member 11 from the obtained direct-current components.

On the other hand, the sinusoidal alternating-current components of the sequential data of the sensor signals shown in FIGS. 18 and 19 correspond to the phase change of the second gear teeth 14 of the rotating second engagement member 12. Thus, the arithmetic control device 50 can detect the phase of the rotating second engagement member 12 based on the alternating-current component.

Next, the arithmetic control executed by the arithmetic control device 50 according to this embodiment will be specifically described. When receiving an engagement instruction, the arithmetic control device 50 performs the process shown in FIG. 22 to engage the dog clutch 10.

In step S21, the arithmetic control device 50 stores the instruction time t1 when the engagement instruction is received, similarly to step S1 in FIG. 12.

Subsequently, in step S22, similarly to step S2 in FIG. 12, the arithmetic control device 50 detects the first rotational speed $\omega 1$ of the first engagement member 11 and the second rotational speed $\omega 2$ of the second engagement member 12. Since the second engagement member 12 is rotating and the first engagement member 11 is stationary, the first rotational speed $\omega 1$ is zero.

Next, in step S23, similar to step S3 in FIG. 12, the arithmetic control device 50 calculates the torque T$\omega$ for the electric motor 30 required to make the rotational speed difference between the first engagement member 11 and the second engagement member 12 equal to or less than the predetermined value $\omega$s.

Next, in step S24, the arithmetic control device 50 predicts a target timing tt for the engagement at which the rotational speed difference $\Delta\omega$ becomes equal to or less than the predetermined value $\omega$s. The target timing tt is predicted based on the first rotational speed $\omega 1$ and the second rotational speed $\omega 2$ detected in step S22 and the time variation characteristics of the rotational speed of the electric motor 30. Here, the rotation start timing of the first engagement member 11 is set as tentative time.

Next, in step S25, the arithmetic control device 50 detects the stationary phase $\theta 1$ of the stationary first engagement member 11. At this time, the stationary phase $\theta 1$ is detected based on the direct-current components of the sequential data of the sensor signals of the phase difference sensor 40, as described above.

Next, in step S26, the arithmetic control device 50 detects the rotating phase $\theta 2$ of the rotating second engagement member 12. At this time, the rotating phase $\theta 2$ is detected based on the alternating-current components of the sequential data of the sensor signals of the phase difference sensor 40, as described above.

Next, in step S27, the arithmetic control device 50 calculates the timing tcf for the engageable state that is later than the target engagement timing tt based on the time variation characteristics of the rotational speed of the electric motor 30 and the stationary phase $\theta 1$ and the rotating phase $\theta 2$ detected in steps S25 and S26.

Next, in step S28, the arithmetic control device 50 calculates the time difference $\Delta t$ between the timing tcf for the engageable state and the target timing tt of the engagement.

Next, in step S29, the arithmetic control device 50 determines whether the time difference $\Delta t$ is equal to or smaller than a threshold value t4. When the timing tcf of the engageable state is to coincide with the target timing tt, the threshold value t4 is set to 0. If the determination in step S29 is NO, the process returns to step S24 after a predetermined time has elapsed. In step S24, the target timing tt is predicted again. If the determination in step S29 is YES, the process proceeds to step S30.

In step S30, the arithmetic control device 50 outputs the torque Tω to the electric motor 30 at the rotation start timing of the first engagement member 11 that corresponds to the target timing tt. This causes the first engagement member 11 to start rotating. As a result, as shown in FIG. 17, the timing tcf for the engageable state coincides with the target timing tt for the engagement.

Next, the arithmetic control device 50 performs steps S31 and S32. Step S31 and S32 are the same as step S12 and S13 in FIG. 12. This causes the dog clutch 10 to be engaged, and the process shown in FIG. 22 ends.

Figure 22:
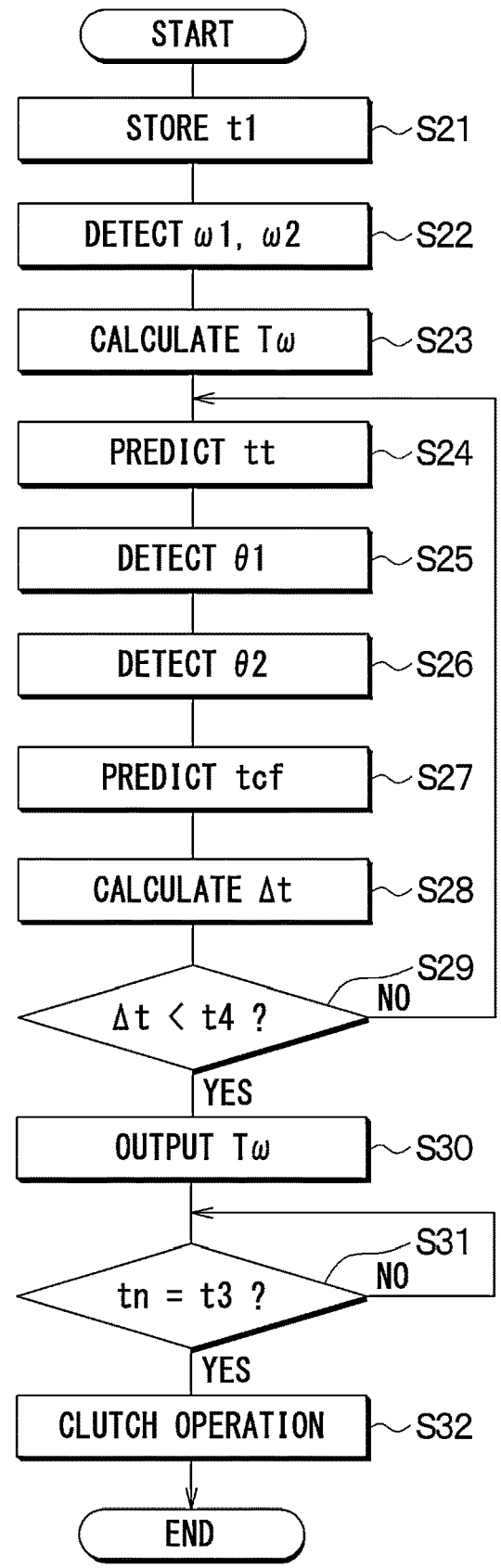
FIG. 22 is a flowchart showing a process executed by an arithmetic control device of the fourth embodiment.

In the process shown in FIG. 22, step S22 corresponds to a rotational speed detection unit configured to detect a first rotational speed of the first engagement member 11 and a second rotational speed of the second engagement member 12. Step S24 corresponds to an arrival timing predicting unit configured to predict an arrival timing at which the rotational speed difference reaches a predetermined value or less during the rotational speed adjustment. Step S26 corresponds to a rotating member detecting unit configured to detect a time variation of the phase of a rotating engagement member, which is one of the first engagement member 11 and the second engagement member 12 that is rotating, based on the alternating-current components of the sequential data of the sensor signals of the phase difference sensor. Step S25 corresponds to a stationary member detecting unit configured to detect the phase of a stationary engagement member, which is the other of the first and second engagement members that is stationary, based on the direct-current components of the sequential data of the sensor signals of the phase difference sensor. Step S27 corresponds to an engageable timing predicting unit configured to predict a predicted engageable timing at which the first engagement member 11 and the second engagement member 12 are engageable with each other after the arrival timing predicted by the arrival timing predicting unit. Steps S29 and S30 correspond to a phase correcting unit configured to perform a phase correction for at least one of the first engagement member 11 and the second engagement member 12 before the arrival timing.

In this embodiment, when the second engagement member 12 is rotating and the first engagement member 11 is stationary, the arithmetic control device 50 adjusts the rotation start timing of the first engagement member 11, which is the timing at which torque starts to be input to the first engagement member 11. The rotation start timing is not limited to this case. The rotation start timing may be a timing at which a torque starts to be input to the first engagement member 11 while both the first engagement member 11 and the second engagement member 12 are rotating. Even in this case, the similar effects as in the present embodiment can be obtained.

(Other embodiments) (1) In each of the above-described embodiments, the arithmetic control device 50 performs the phase correction for the first engagement member 11 so that the timing of the engageable state coincides with the target timing. However, without being limited thereto, the arithmetic control device 50 may perform the phase correction for the first engagement member 11 so that the timing of the engageable state approaches the target timing, compared to a case in which the phase correction is not performed. This also improves the responsiveness compared to the case where no phase correction is performed.

Specifically, in the first embodiment, in steps S10 and S11, the arithmetic control device 50 performs the phase correction for the first engagement member 11 so that the time difference Δt calculated in step S9 becomes zero. Without being limited to this, the arithmetic control device 50 may perform the phase correction for the first engagement member 11 so that the time difference Δt calculated in step S9 is adjusted to be closer to 0 compared to the case where the phase correction is not performed.

In addition, in the third embodiment, in steps S10-1 and S11-1, the arithmetic control device 50 performs the phase correction for the first engagement member 11 based on the phase difference θtt at the target engagement timing tt predicted in step S9-1, so that the phase difference at the target engagement timing tt becomes the phase difference in the engageable state. Without being limited to this, the arithmetic control device 50 may perform a phase correction for the first engagement member 11 based on the phase difference θtt at the target engagement timing tt predicted in step S9-1 so that the phase difference at the target engagement timing tt approaches the phase difference in the engageable state.

In the fourth embodiment, in steps S10 and S11, the arithmetic control device 50 adjusts, as the phase correction, the rotation start timing of the first engagement member 11 so that the time difference Δt calculated in step S28 becomes zero. Without being limited to this, the arithmetic control device 50 may adjust the rotation start timing of the first engagement member 11 so that the time difference Δt calculated in step S28 is adjusted to be closer to 0 compared to the case where the phase correction is not performed.

(2) The power transmission system 1 in each of the above-described embodiments is mounted on a vehicle and is used to transmit and block the power of the electric motor 30 to the drive wheels, but may be used for other purposes. In the power transmission system 1 of each of the above-described embodiments, the first engagement member 11 moves in the axial direction DR1. However, depending on the application, the second engagement member 12 may move in the axial direction DR1. Both the first engagement member 11 and the second engagement member 12 may move in the axial direction DR1. In other words, moving at least one of the first engagement member 11 and the second engagement member 12 in the axial direction DR1 by the actuator is necessary.

In addition, in each of the above-described embodiments, the phase of the first engagement member 11 is corrected by adjusting the rotational speed of the first engagement member 11. However, depending on the application, the phase of the second engagement member 12 may be corrected by adjusting the rotational speed of the second engagement member 12. The phases of both the first engagement member 11 and the second engagement member 12 may be corrected by adjusting the rotational speeds of both the first engagement member 11 and the second engagement member 12.

(3) In each of the above-described embodiments, the resolver built into the electric motor 30 is used to detect the first rotational speed ω1 of the first engagement member 11. A wheel speed sensor is used to detect the second rotational speed ω2 of the second engagement member 12. However, the phase difference sensor 40 may be used to detect each of the first rotational speed ω1 and the second rotational speed ω2. The sequential data of the sensor signals of the phase difference sensor 40 includes information on the first rotational speed ω1, the second rotational speed ω2, and the difference between them. Therefore, it is possible to detect each of the first rotational speed ω1 and the second rotational speed ω2 based on the sequential data of the sensor signals of the phase difference sensor 40.

(4) The present disclosure is not limited to the foregoing description of the embodiments and can be modified. The present disclosure may also be varied in many ways. Such variations are not to be regarded as departure from the disclosure, and all such modifications are intended to be included within the scope of the disclosure. Individual elements or features of a particular embodiment are generally not limited to that particular embodiment, but, where applicable, are interchangeable and can be used in a selected embodiment, even if not specifically shown or described. Further, in each of the above-mentioned embodiments, it goes without saying that components of the embodiment are not necessarily essential except for a case in which the components are particularly clearly specified as essential components, a case in which the components are clearly considered in principle as essential components, and the like.

(5) The control unit and the method described in the present disclosure may be implemented by a special purpose computer which is configured with a memory and a processor programmed to execute one or more particular functions embodied in computer programs of the memory. Alternatively, the control unit and the method described in the present disclosure may be realized by a dedicated computer provided by configuring a processor with one or more dedicated hardware logic circuits. Alternatively, the controller and the method described in the present disclosure may be implemented by one or more special purpose computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium.

The invention claimed is:

1. A dog clutch control system comprising:
a dog clutch including:
a first engagement member configured to rotate about an axis in a rotational direction, the first engagement member having first gear teeth formed on an entire circumference of the first engagement member in the rotational direction; and
a second engagement member configured to rotate about the axis in the rotational direction, the second engagement member having second gear teeth formed on an entire circumference of the second engagement member in the rotational direction;
an actuator configured to move at least one of the first engagement member and the second engagement member to switch between an engagement state and a disengagement state, the engagement state being a state where the first engagement member is engaged with the second engagement member through engagement of the first gear teeth and the second gear teeth, the disengagement state being a state where the first engagement member is disengaged from the second engagement member;
a rotational speed detecting unit configured to detect a first rotational speed of the first engagement member and a second rotational speed of the second engagement member;
an arrival timing predicting unit configured to predict an arrival timing at which a rotational speed difference between the first rotational speed and the second rotational speed is adjusted to a value equal to or less than a predetermined threshold during a rotational speed adjustment, the arrival timing being predicted based on the first rotational speed and the second rotational speed detected by the rotational speed detecting unit and a time variation characteristic of the rotational speed difference during the rotational speed adjustment; and
a phase correcting unit configured to perform a phase correction for at least one of the first engagement member and the second engagement member before the arrival timing, wherein
the phase correcting unit is configured to perform the phase correction to bring an engageable timing closer to the arrival timing compared to a case without the phase correction, the engageable timing being a timing after the arrival timing and at which the first engagement member is engageable with the second engagement member.

2. The dog clutch control system according to claim 1, further comprising
an engageable timing predicting unit configured to predict a predicted engageable timing that is a timing of an engageable state after the arrival timing predicted by the arrival timing predicting unit, wherein
the phase correcting unit is further configured to perform the phase correction during the rotational speed adjustment to bring the engageable timing closer to the arrival timing than the predicted engageable timing.

3. The dog clutch control system according to claim 2, further comprising
a phase difference sensor configured to output sensor signals corresponding to a phase difference between the first engagement member and the second engagement member, wherein
the engageable timing predicting unit is configured to predict the engageable timing that is a timing after the arrival timing based on the time variation characteristic of the rotational speed difference during the rotational speed adjustment and sequential data of the sensor signals output by the phase difference sensor during the rotational speed adjustment.

4. The dog clutch control system according to claim 2, wherein
the engageable timing predicting unit is configured to predict the predicted engageable timing based on a relationship between an elapsed time and the engageable timing, the relationship being found based on previous timings of the engageable state before the arrival timing.

5. The dog clutch control system according to claim 1, further comprising
a phase difference predicting unit configured to predict a phase difference between the first engagement member and the second engagement member at the arrival timing that is predicted by the arrival timing predicting unit, wherein
the phase correcting unit is configured to perform the phase correction during the rotational speed adjustment based on the phase difference predicted by the phase difference predicting unit to bring the phase difference at the arrival timing closer to a phase difference at which the first engagement member is engageable with the second engagement member.

6. The dog clutch control system according to claim 1, further comprising
an engageable timing predicting unit configured to predict a predicted engageable timing that is a timing of an engageable state after the arrival timing predicted by the arrival timing predicting unit, wherein
the phase correcting unit is configured to, as the phase correction, determine a start timing of the rotational speed adjustment to bring the engageable timing closer to the arrival timing than the predicted engageable timing.

7. The dog clutch control system according to claim 6, further comprising
a phase difference sensor configured to output sensor signals corresponding to a phase difference between the first engagement member and the second engagement member;
a rotating member detecting unit configured to detect a time variation of a phase of a rotating engagement member based on alternating-current components of sequential data of the sensor signals output by the phase difference sensor, the rotating engagement member being one of the first engagement member and the second engagement member that is rotating; and
a stationary member detecting unit configured to detect a time variation of a phase of a stationary engagement member based on direct-current components of the sequential data of the sensor signals output by the phase difference sensor, the stationary engagement member being the other of the first engagement member and the second engagement member that is stationary, wherein
the engageable timing predicting unit is configured to predict the predicted engageable timing based on the time variation of the phase of the rotating engagement member detected by the rotating member detecting unit, the phase of the stationary engagement member detected by the stationary member detecting unit, and a time variation characteristic of the rotational speed difference during the rotational speed adjustment.

* * * * *